United States Patent [19]

Ichimura et al.

[11] Patent Number: 5,758,040
[45] Date of Patent: May 26, 1998

[54] ENERGY-SAVING FACSIMILE APPARATUS AND ENERGY-SAVING METHOD FOR FACSIMILE APPARATUS

[75] Inventors: Minori Ichimura, Sagamihara; Shoji Okabe, Atsugi, both of Japan

[73] Assignee: Ricoh Company, Ltd., Tokyo, Japan

[21] Appl. No.: 582,464

[22] Filed: Jan. 3, 1996

[30] Foreign Application Priority Data

Jan. 26, 1995 [JP] Japan ................. 7-010321
Feb. 3, 1995 [JP] Japan ................. 7-016643

[51] Int. Cl.$^6$ ................................................. H04N 1/32
[52] U.S. Cl. ...................... 395/113; 358/442; 358/468
[58] Field of Search .................................. 358/400, 442,
    358/468, 404, 444; 348/730; 395/113, 114;
    399/88-90; 379/100; H04N 1/00, 1/02

[56] References Cited

U.S. PATENT DOCUMENTS

| 5,410,419 | 4/1995 | Muramatsu et al. | 358/468 |
| 5,420,667 | 5/1995 | Kaneko et al. | 395/113 |
| 5,587,799 | 12/1996 | Kawamura et al. | 358/404 |

FOREIGN PATENT DOCUMENTS

| 32 13 266 | 1/1983 | Germany. |
| 195 45 918 | 8/1996 | Germany. |
| 57-13852 | 1/1982 | Japan. |
| 57-168573 | 10/1982 | Japan. |
| 58-157251 | 9/1983 | Japan. |
| 3-108941 | 5/1991 | Japan. |

*Primary Examiner*—Kim Vu
*Attorney, Agent, or Firm*—Oblon, Spivak, McClelland, Maier & Neustadt, P.C.

[57] ABSTRACT

An energy-saving unit causes a facsimile apparatus to enter an energy-saving mode in which power consumption is reduced in the facsimile apparatus, and further determines to cause the facsimile apparatus to exit the energy-saving mode when a predetermined cause has been detected. A main control unit controls the entirety of the facsimile apparatus and supplies an energy-saving control signal to the energy-saving unit, the energy-saving control signal indicating instructions that the energy-saving unit is to perform. The energy-saving unit supplies an energy-saving canceling cause signal to the main control unit, the energy-saving canceling cause signal indicating the predetermined cause due to which the energy-saving unit has determined to cause the facsimile apparatus to exit the energy-saving mode.

5 Claims, 8 Drawing Sheets

ENERGY-SAVING FACSIMILE APPARATUS AND ENERGY-SAVING METHOD FOR FACSIMILE APPARATUS

BACKGROUND OF THE INVENTION

1. Field of the Invention

The present invention relates to an energy-saving facsimile apparatus and an energy-saving method for a facsimile apparatus. In particular, the present invention relates to a facsimile apparatus having a standby state such that a low power is consumed when the apparatus is in the standby state. Other than a facsimile apparatus, there are various machines, each of which has a standby state in which a power supply is required therefor even while the machine is not actually being used. Such machines include a telephone, a printer and a composite machine having functions of the telephone and printer. The present invention relates to energy saving in such machines.

Further, the present invention also relates to a facsimile apparatus and an energy-saving method in which both a sub-energy saving mode and a main energy saving mode are provided. The apparatus may switch between these two modes sequentially or according to a software program.

2. Description of the Related Art

For example, Japanese Laid-Open Patent Application No. 57-13852 discloses a facsimile apparatus in which a connection of a power source is controlled and thus power consumption is reduced. Specifically, the apparatus monitors a telephone line for determining how to control the connection of the power source for supplying power to the facsimile apparatus body.

In fact, when transmitting data to another terminal, a an off-hook state inevitably occurs in a telephone so as to enable a call to the other terminal. This occurrence of off-hook state is detected by a line-state detecting circuit and thus the power source is connected to the facsimile apparatus body automatically. When receiving data from another terminal, the off-hook state of the telephone occurs when accepting a call from the other terminal, and thus the power source is also connected to the facsimile apparatus body automatically.

In such a facsimile apparatus, the power source to the facsimile apparatus body is disconnected during a standby state. In order to control connection and disconnection of the power source to the facsimile apparatus, an electric circuit is provided and activation of this circuit depends on a result of line-state detection by the line-state detecting circuit. As a result, the power supply is controlled only as a result of the line-state monitoring.

Further, Japanese Laid-Open Patent Application No. 57-168573 discloses an art in which a sub-control unit other than a main control unit monitors a state of an entirety of a facsimile apparatus and a software control unit controls connection of a power source. Specifically, two CPU comprising the main control unit and sub-control unit respectively are provided. When receiving data and when transmitting data, a main power source is connected to one CPU and a sub-power source is connected to the other CPU which is in its stand-by state. In a standby state of the facsimile apparatus, only the one CPU (sub-control unit) operates and thus power consumption is economized. The sub-control unit controls the power source.

In this system using the main control unit and sub-control unit, no signal communication between the two control units is performed and only the sub-control unit has power supply control. Accordingly, a relatively low reliability is ensured.

Further, in the related art, no means is available for indicating to a user that the facsimile apparatus is in a energy-saving state.

Further, in the related art, it is not clear whether or not, in a standby state, the power source is connected to motors which do not operate, to drivers for other electric equipment, etc. If the power source is connected thereto in the standby state, useless leakage electric currents may flow therebetween.

Further, in the related art, in a state of neither transmitting data nor receiving data, the power source is disconnected from the facsimile apparatus body. Therefore, it is not possible to manage memories and time schedules in cases of storing received data or data to be transmitted in a memory, a time-specified polling reception operation, and a time-specified transmission operation. Further, even if it is possible to manage memories and time schedules in cases of storing received data or data to be transmitted in a memory, a time-specified polling reception operation, a time-specified transmission operation, a prior heating heater operation, and so forth by connecting the power source to the facsimile apparatus body in each case, useless power is also consumed as a result of connecting the power source to the whole facsimile apparatus body.

Further, in the related art, a rise trigger signal of any one of an energy-saving on-and-off switch (energy-saving key) being pressed, an original image sheet being set, a ringing signal being received, an off-hook signal being received and so forth is detected when the facsimile apparatus is in an energy-saving state and thus the facsimile apparatus exits from the energy-saving state. However, if such a rise trigger signal is erroneously detected, the facsimile apparatus unexpectedly exits from the energy saving state and it is not possible to re-enter the energy-saving state. As a result, energy saving cannot be achieved although it is necessary. Further, in such a system, it is necessary to surely detect the rise trigger signal of each of the energy-saving on-and-off switch (energy-saving key) being pressed, the original image sheet being set, the ringing signal being received, the off-hook signal being received and so forth. For this purpose, an energy-saving control unit should bear a large load.

Further, for example, Japanese Laid-Open Patent Application No. 58-157251 discloses a method using a main power source and a standby power source. The main power source is used instead of the stand-by power source only when a predetermined operation is performed. Specifically, in the disclosed method, a standby power source circuit is always connected with an external power source and supplies a dc voltage of 5 volts obtained as a result of converting from an ac voltage of 100 volts. A main power source circuit is connected with the external power source with a switch. During a data transmitting operation, either setting of an original image sheet causes the switch to close or a user directly operates the switch and thus the switch is closed. During a data receiving operation, a call acceptance signal causes the switch to close. Thus, the main power source circuit operates. After a respective one of the data transmission and receiving operations has been completed, the switch is opened and thus the main power source does not operate.

In this method, only the standby power source circuit operates in a standby state and thus it is possible to maintain power consumption to be low. However, provision of two power source circuits, i.e., the main power source circuit and standby power source circuit, makes the facsimile apparatus large-sized and require high costs. Further, it is necessary to change a state in which the standby power source circuit operates to a state in which the main power source circuit operates when moving to a state in which a facsimile operation can be performed. This state change requires time and thus it may not be possible to immediately start the facsimile operation.

SUMMARY OF THE INVENTION

A first object of the present invention is to provide an energy-saving facsimile apparatus by which the above-described problems occurring in the related art such as those disclosed in the Japanese Laid-Open Patent Applications Nos. 57-13852 and 57-168573 can be solved. Specifically, power supply control depends not only on a signal obtained from a telephone line but also other various signals. Further, a main control unit and a sub-control unit are synchronized with one another and thus appropriately share power supply control.

A second object of the present invention is to provide an energy-saving facsimile apparatus in which an indication is made to a user that the facsimile apparatus is in an energy-saving state.

A third object of the present invention is to provide an energy-saving facsimile apparatus in which managing of memories and time schedules can be performed in cases of storing received data or data to be transmitted in a memory, a time-specified polling reception operation, a time-specified transmission operation, a prior heating heater operation, and so forth even when a power source is not connected to a facsimile apparatus body. In the energy-saving facsimile apparatus, it is also possible to eliminate power consumption for functions which are not being used and to economize power consumption for leakage electric currents flowing in motors and other electric equipment.

A fourth object of the present invention is to provide an energy-saving facsimile apparatus in which an energy-saving mode exiting operation using rise trigger signals of an energy-saving on and off switch being pressed, an original image sheet being set, a ringing signal being received, an off-hook signal being received and so forth can be simplified. Further, when the facsimile apparatus unexpectedly exits from the energy-saving mode due to erroneous detection of a rise trigger signal, it is possible that the facsimile apparatus can re-enter the energy saving mode.

A fifth object of the present invention is to provide a facsimile apparatus and an energy-saving method in which the above-described problems occurring in the related art such as that disclosed in the Japanese Laid-Open Patent Application No. 58-157251 can be solved. Specifically, only a single power source circuit is provided and the facsimile apparatus can enter an energy-saving state either as a result of a predetermined manipulation being performed or even if no predetermined manipulation is performed. As a result, the energy-saving facsimile apparatus and energy-saving method can be embodied with low costs.

A sixth object of the present invention is to provide a facsimile apparatus and an energy-saving method in which it is possible that the facsimile apparatus can exit from an energy-saving mode when the facsimile apparatus is in a standby mode.

A seventh object of the present invention is to provide a facsimile apparatus and an energy-saving method in which it is possible that the facsimile apparatus can exit from an energy-saving mode rapidly when the facsimile apparatus is in a stand-by mode.

An eighth object of the present invention is to provide a facsimile apparatus and an energy-saving method in which it is possible that an energy-saving function is effectively used and also has flexibility.

A facsimile apparatus, according to the present invention, comprises:
  energy-saving means which causes said facsimile apparatus to enter an energy-saving mode in which power consumption is reduced in said facsimile apparatus, and further determines to cause said facsimile apparatus to exit said energy-saving mode when a predetermined cause has been detected; and
  main control means which controls the entirety of said facsimile apparatus and supplies an energy-saving control signal to said energy-saving means, said energy-saving control signal indicating instructions that said energy-saving means is to perform;
  wherein:
    said energy-saving means supplies an energy-saving canceling cause signal to said main control means, said energy-saving canceling cause signal indicating the predetermined cause due to which said energy-saving means has determined to cause said facsimile apparatus to exit said energy-saving mode.

In this facsimile apparatus, in said energy-saving mode, no power may be supplied to said main control means. Further, power-supply switching means may be provided, which means causes a power source to selectively connected to units provided in said facsimile apparatus under control of said energy-saving means. Further, energy-saving indication means may be provided, which means indicates that said facsimile apparatus is in said energy-saving mode.

Further, said main control means may redetect the predetermined cause due to which said energy-saving means has determined to cause said facsimile apparatus to exit said energy-saving mode, and thus determines whether or not the determination of said energy-saving means is based on a correct one of the predetermined cause;
  said main control means supplies the energy-saving control signal which instructs said energy-saving means to cause said facsimile apparatus to enter said energy-saving mode when said main control means has determined that the previous determination of said energy-saving means to cause said facsimile apparatus to enter said energy-saving mode is based on the correct cause, and said main control means supplies the energy-saving control signal which instructs said energy-saving means not to cause said facsimile apparatus to exit said energy-saving mode when said main control means has determined that the previous determination of said energy-saving means to cause said facsimile apparatus to enter said energy-saving mode is not based on the correct cause.

The predetermined cause due to which said energy-saving means determines to cause said facsimile apparatus to exit said energy-saving mode may comprise an event that an energy-saving on-and-off switch has been pressed, an event that an original image sheet has been set, an event that a ringing signal has been received and an event that an off-hook of an externally provided telephone has been performed.

Thereby, two control means, the main control means controlling the entirety of the facsimile apparatus and the energy-saving means controlling entrance into/exit from the energy-saving state are provided. The energy-saving means monitors not only a state of a telephone line but also the entirety of the facsimile apparatus by detecting rise trigger signals when the facsimile apparatus is in the energy-saving state. Thereby, it is possible to control power supply to each unit in the facsimile apparatus according to the monitoring result of the entirety of the facsimile apparatus in addition to of the telephone line.

Further, the main control means energy-saving means communicate with one another using the energy-saving control signal and the energy-saving canceling cause signal. Thereby, the two control means can effectively share control operation in synchronization with each other.

Further, the energy-saving indication means is provided, which indicates that the facsimile apparatus is in the energy-saving state and thus power consumption is reduced, and is controlled by the energy-saving means. Thereby, a user can easily recognize the energy-saving state.

Further, if managing of a memory and/or time is needed for a memory image storage operation, a time specifying poling signal reception operation, a time specifying signal transmission operation or the like, the main control means can inform to the energy-saving means which units are used for the managing of a memory and/or time and thus to be connected to the power source. Thereby, in the energy-saving state, the managing of a time and/or a memory can be continued. Further, if a memory image storage operation, a time specifying poling signal reception operation, a time specifying signal transmission operation, a heater previous heating operation or the like is needed in the energy-saving state, the power source can be connected to only appropriate units in the facsimile apparatus. Thereby, a waste of power resulting from supplying power to units which do not actually operate can be eliminated.

Further, the energy-saving means uses the energy-saving canceling cause signal to inform the main control means which rise trigger signal has caused the energy-saving means to determine to cancel the energy-saving state. The main control means can use this information in redetecting the rise trigger signal and thus determine whether the rise trigger signal detected is a correct rise trigger signal for canceling the power saving state. There may be an event in which a noise occurs in the communications line, acts as the rise trigger signal and thus causes the energy-saving means to determine to cancel the energy-saving state. In such an event, the main control means redetects the thus-detected rise trigger signal, examines it in detail and thus can determine that the detected signal is merely noise and thus canceling of the energy-saving state is not necessary. By using such a double detection system, it is possible to simplify the energy-saving means because the energy-saving means should perform merely rough detection. Thereby, it is possible to use the energy-saving means which consumes a small power and thus an energy-saving effect is improved.

Further, the above-mentioned facsimile apparatus may further comprise:

a network control unit which detects a calling signal from a switchboard, performs a dial calling, and switches connection with a telephone line between said facsimile apparatus and an externally provided telephone;

a power source which selectively supplies power to units in said facsimile apparatus; and an energy-saving mode operation circuit which controls said power source and causes said power source to supply power to a predetermined one of said units in said facsimile apparatus;

wherein:

said energy-saving means detects, as the predetermined cause, one of a calling signal, a signal indicating an off-hook of said externally provided telephone, a signal indicating that an on-hook button is pressed, a signal indicating that an original image sheet is inserted in said facsimile apparatus, and an event that an energy-saving mode button is pressed, the detection being performed using predetermined signals supplied from units to which power is supplied under control of said energy-saving mode operation circuit; and said energy-saving means determines that said facsimile apparatus should exit said energy-saving mode when having detected one of the calling signal, signal indicating the off-hook of said externally provided telephone, signal indicating that the on-hook button is pressed, signal indicating that the original image sheet is inserted in said facsimile apparatus, and the event that an energy-saving mode button is pressed.

A method of energy saving in a facsimile apparatus, according to the present invention comprises the steps of:

a) causing said facsimile apparatus to enter a strict energy-saving mode in which power is not supplied to first predetermined units in said facsimile apparatus, said first predetermined units being ones which consume a relatively large amount of power and are such that a relatively long starting-up time is required for a process, said process being that said facsimile apparatus exits said strict energy-saving mode, power is supplied to said first predetermined units and thus said facsimile apparatus can actually execute a predetermined function of said facsimile apparatus;

b) causing said facsimile apparatus to enter an lenient energy-saving mode in which power is not supplied to second predetermined units in said facsimile apparatus, said second predetermined units being ones which consume a relatively small amount of power and are such that a relatively short starting-up time is required for a process, said process being that said facsimile apparatus exits said strict energy-saving mode, power is supplied to said second predetermined units and thus said facsimile apparatus can actually execute said predetermined function of said facsimile apparatus In said strict energy-saving mode, power supply to all the units in said facsimile apparatus is stopped, excepting means for canceling said strict energy-saving mode; and in said lenient energy-saving mode, only power supply to means for indicating predetermined information of said facsimile apparatus to a user is stopped.

Further, said step b) is first performed and then said step a) is performed. Further, a first predetermined time which has elapsed until said step b) is performed and a second predetermined time which has elapsed until said step a) is performed since said step b) was performed may be arbitrarily adjusted by modifying a software program which a computer of said facsimile apparatus uses to control said facsimile apparatus.

Said first and second predetermined times are times applicable under a condition in which none of a calling signal, a signal indicating an off-hook of said externally provided telephone, a signal indicating that an on-hook button is pressed, a signal indicating that an original image sheet is inserted in said facsimile apparatus, an event that an energy-saving mode button is pressed is detected during said first and second predetermined times.

Thereby, only a single one of the power source is used when the facsimile apparatus enters the energy-saving mode. Therefore, an energy-saving function can be provided in low costs. Further, timers may be used so that the facsimile apparatus gradually moves from a standby state, to the lenient energy-saving mode and then to the strict energy-saving mode. The standby state is a state of the facsimile apparatus in which a user does not actually use the facsimile apparatus and a state in which power is supplied to all the units in the apparatus. Thus, effective use of the energy-saving function, in view of energy-saving effect and also of a speed at which the facsimile apparatus once having entering the energy-saving mode is started up so as to enable to execute a predetermined function, is enabled.

Further, it is possible not to use the energy-saving function when the facsimile apparatus is in the standby state. This can be achieved by appropriately operating software switches of the facsimile apparatus. By not using the energy-saving function, it is possible to use a facsimile function of the facsimile apparatus immediately when it is required. If a user wishes to use the facsimile apparatus frequently, software switches may be appropriately operated and thus the facsimile apparatus can be prevented from entering the energy-saving mode. Thereby, it is possible to use the facsimile apparatus in a stable condition and thus the facsimile apparatus can be prevented from being degraded due to ineffective frequent change between the standby state and the energy-saving mode.

Further, by using a function of the lenient energy-saving mode, it is also possible to use the facsimile function of the facsimile apparatus immediately when it is required in a case where the facsimile apparatus is in the lenient energy-saving mode. Further, the first and second predetermined times can be arbitrarily adjusted by a user by appropriately operating the software switches. Thus, it is possible to have flexibility when using the energy-saving function.

Other objects and further features of the present invention will become more apparent from the following detailed description when read in conjunction with the accompanying drawings.

DESCRIPTION OF PREFERRED EMBODIMENTS

Figure 1:
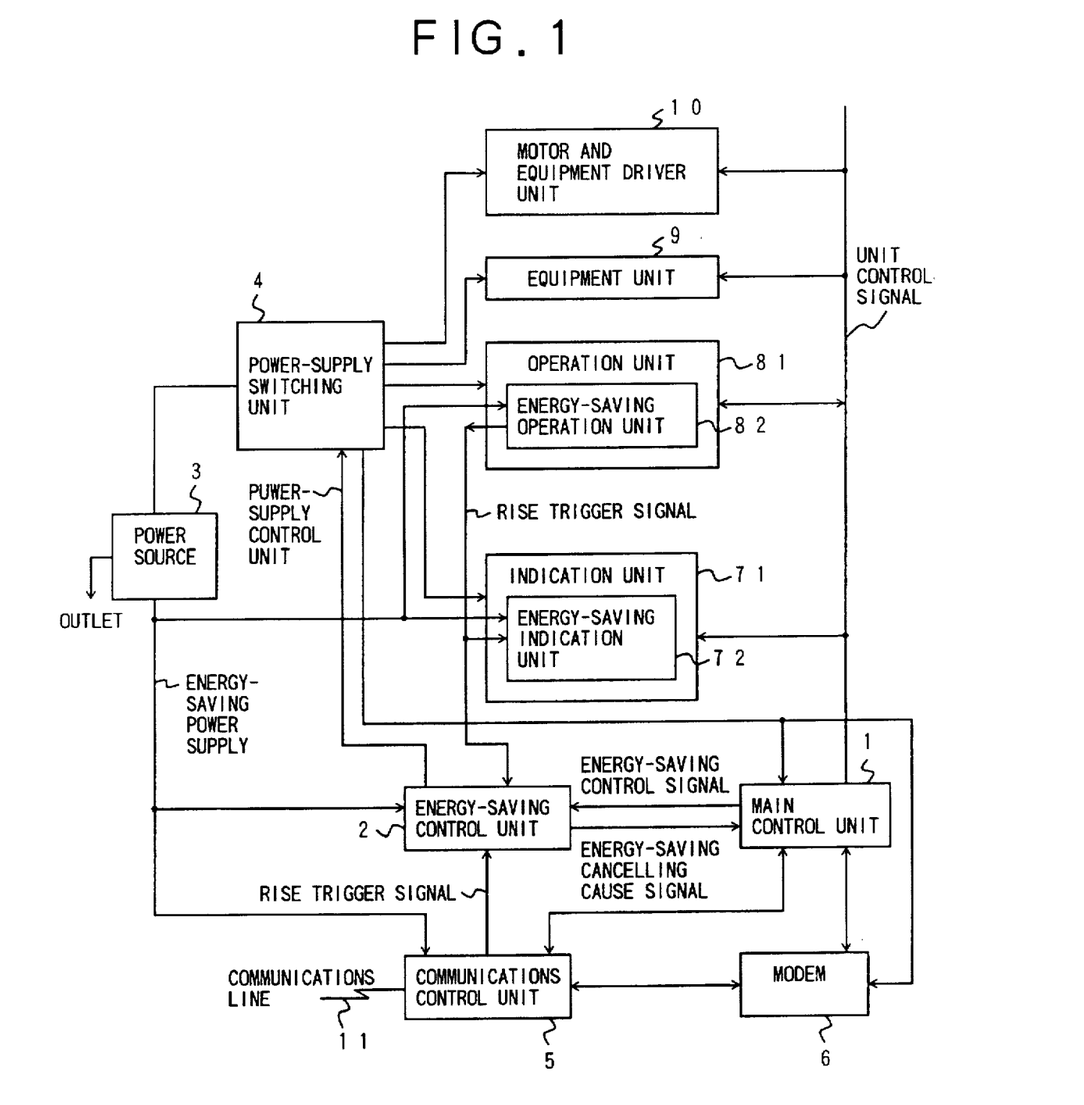
FIG. 1 shows a block diagram of an energy-saving facsimile apparatus in a first embodiment of the present invention.

As shown in FIG. 1, an energy-saving facsimile apparatus in a first embodiment of the present invention includes a main control unit 1. The main control unit 1 controls the entirety of this facsimile apparatus and includes a CPU, a ROM, a RAM and so forth. The main control unit 1, according to software programs stored in the ROM, controls the entirety of the facsimile apparatus using a unit control signal. The RAM includes a region storing facsimile-apparatus attribute information such as information for managing a time for a time-specifying service function, a buffer memory region storing image information when sending and receiving the image information, a work area region, and an image-information storage region storing image information when performing memory-use image-information sending and receiving.

The facsimile apparatus further includes an energy saving control unit 2 which controls an energy-saving function. The energy-saving control unit 2 is made of a energy-saving microcomputer or the like which includes a CPU, a ROM and a RAM in one chip (integrated circuit) and uses a small amount of electric power during operation.

The facsimile apparatus further comprises a communications control unit 5, a modem 6, an indication unit 71, an energy-saving indication unit 72, an operation unit 81, an energy-saving operation unit 82, an equipment unit 9, and a motor and equipment driver unit 10.

The facsimile apparatus further includes a power source 3 which supplies electric power to the entirety of the facsimile apparatus. The power source 3 supplies power, via a power-supply switching unit 4, to each unit of the facsimile apparatus such as the main control unit 1, modem 6, indication unit 71, operation unit 81, equipment unit 9 and so forth. The power-supply switching unit 4 connects the power source 3 to each unit and disconnects the same from each unit according to a power-supply control signal supplied by the energy-saving control unit 2. Further, the power source 3 also supplies power to the motor and equipment driver unit 10 which drives various motors and equipment using the thus-supplied power. These motors and equipment are included in and perform regular functions of the facsimile apparatus such as feeding of recording paper sheets, image printing, and so forth. The power-supply switching unit 4 also connects the power source 3 to the motor and equipment driving unit 10 and disconnects the same from the motor and equipment driving unit 10 according to the power-supply control signal supplied by the energy-saving control unit 2.

The power-supply switching unit 4 is simply made from transistors, MOSFETs or the like. The power source 3 constantly supplies power to the energy-saving control unit 2, communications control unit 5, energy-saving indication unit 72, and energy-saving operation unit 82. Therefore, these units are constantly able to operate even in the energy-saving state.

The energy-saving indication unit 72 is energy-saving indicating means and indicates, to a user, that the facsimile apparatus is in the energy-saving state and thus power consumption is reduced. The energy-saving indication unit 72 may be made of a small light such as a light-emitting diode which is turned on when the facsimile apparatus is in the energy-saving state. Thereby, power consumption when the facsimile apparatus is in the energy-saving state can be reduced.

The energy-saving operation unit 82 is energy-saving canceling means which supplies a rise trigger signal. The rise trigger signal cancels the energy-saving state and thus causes the facsimile apparatus to exit the energy-saving state. The energy-saving operation unit 82 may include a start/stop key, an energy-saving key, an original-image sheet setting sensor, an on-hook dial key and so forth. When one of these keys is operated or the sensor senses the original-image sheet setting, the rise trigger signal is output therefrom.

The above-mentioned start/stop key is a key which a user presses when the user causes the apparatus to start actual facsimile transmission, copying or the like. Generally, if this key is pressed when the apparatus has not been performing any actual operation, the apparatus starts actual facsimile transmission, copying or the like. The above-mentioned on-hook dial key is a key such that when a user presses this key, the user can perform a telephone calling operation including a dialing operation without removing a receiver from a telephone provided together with the apparatus.

Other than using the energy-saving operation unit 82, canceling of the energy-saving state and thus causing the facsimile apparatus to exit the energy-saving state can also be performed in manners which will now be described. Each of rise trigger signals supplied via a communications line 11 can also cancel the energy-saving state and thus cause the facsimile apparatus to exit the energy-saving state. The rise trigger signals are such as a ringing signal, a facsimile-network calling signal, an off-hook signal from an externally provided telephone, and so forth. These rise trigger signals are received via the communications control unit 5 which includes a network control unit (NCU).

The above-mentioned facsimile-network calling signal is a signal which is used for receiving predetermined special services associated with a facsimile transmission operation. For example, a facsimile-network calling signal of 1300 Hz of NTT (Nippon Telegraph and Telephone Public Corp.) is used.

A regular signal sending/receiving operation is performed through the communications line 11, communications control unit 5 and modem 6, and is controlled by the main control unit 1. Communication between the main control unit 1 and energy-saving control unit 2 is performed using two signals, an energy-saving control signal and an energy-saving canceling cause signal. The energy-saving control signal is supplied by the main control unit 1 and indicates contents of control to be performed by the energy-saving control unit 2. The energy-saving canceling cause signal is supplied by the energy-saving control unit 2 and indicates a cause by which the energy saving control unit 2 cancels the energy-saving state and thus causes the facsimile apparatus to exit the energy-saving state.

When the facsimile apparatus is in the energy-saving state, the energy-saving control unit 2 controls the power-supply switching unit 4 and energy-saving indication unit 72. Further, after the energy-saving control unit 2 cancels the energy-saving state and thus causes the facsimile apparatus to exit the energy-saving state by the rise trigger signal supplied via the communications line 11 or from the energy-saving operation unit 82, the energy-saving control unit 2 supplies the energy-saving canceling cause signal to the main control unit 1. The energy-saving canceling cause signal indicates the relevant rise trigger signal which has been sent from the start/stop key, energy-saving key, original-image sheet setting sensor, on-hook dial key or the like, or which is the ringing signal, facsimile-network calling signal, off-hook signal from the externally provided telephone or the like. The energy-saving control unit 2 is the microcomputer or the like which uses a small electric power and thus has a function of merely roughly examining the received rise trigger signal. In comparison to this, the main control unit 1 has a function of examining the same rise trigger signal in detail. For the purpose of examining the rise trigger signal in detail, the main control unit 1 uses the energy-saving canceling cause signal supplied from the energy-saving control unit 2.

Figure 2:
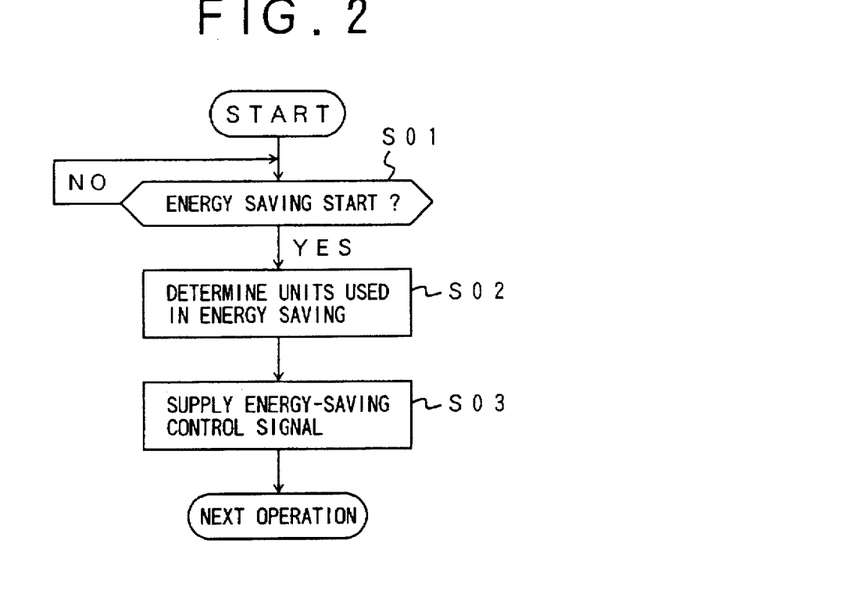
FIG. 2 shows a flowchart of an operation of a main control unit shown in FIG. 1 when the facsimile apparatus enters an energy-saving state.
Figure 4:
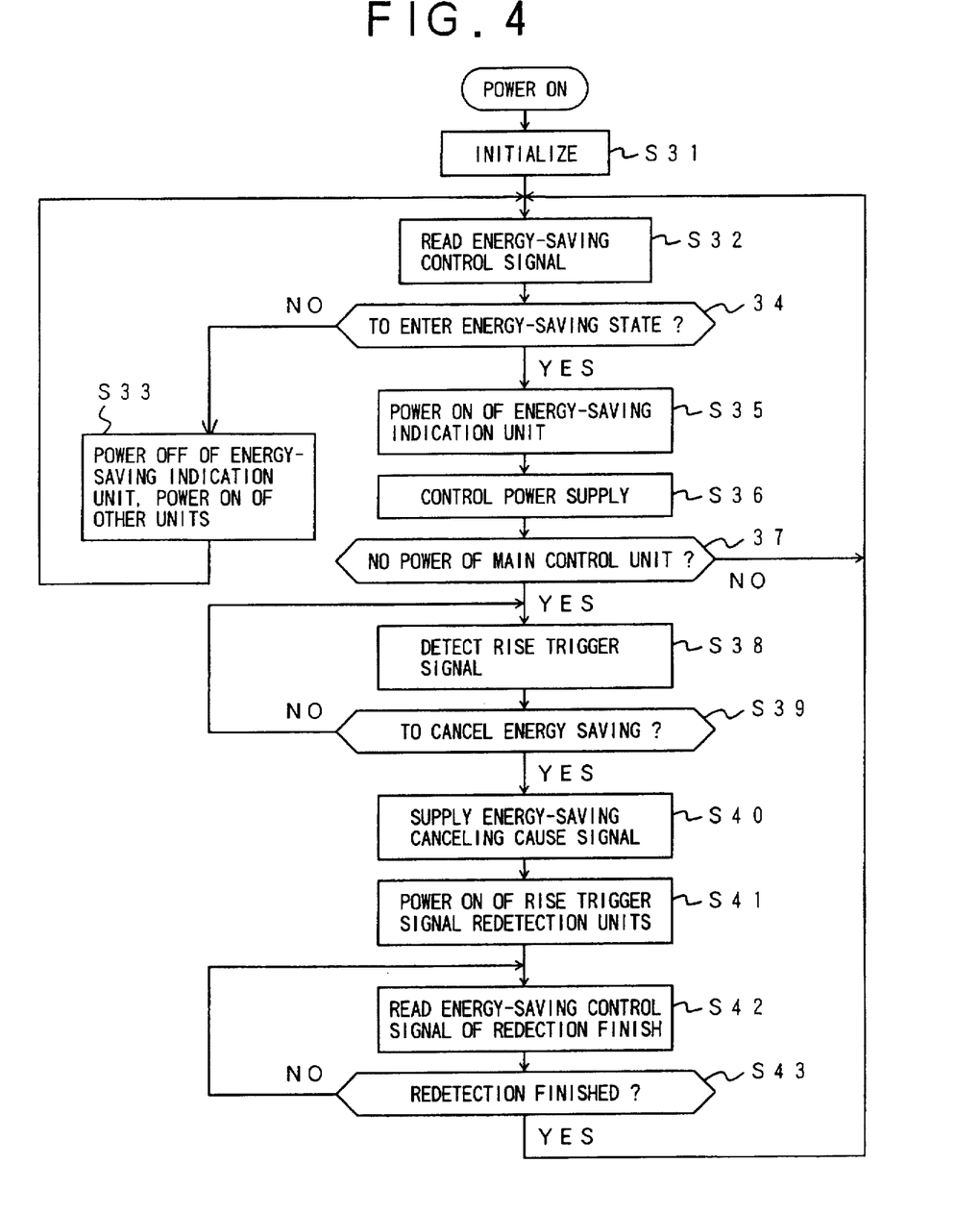
FIG. 4 shows a flowchart of an operation of an energy-saving control unit shown in FIG. 1.

With reference to FIGS. 2 and 4, an operation of the main control unit when the facsimile apparatus enters the energy-saving state will now be described.

With reference to FIG. 2, in a step S01 (hereinafter, the term 'step' being omitted), the main control unit 1 determines whether or not the facsimile apparatus is to enter the energy-saving state. The main control unit 1 determines that the facsimile apparatus is to enter the energy-saving state when a predetermined situation has appeared. The predetermined situation is such as a situation in which a user presses the energy-saving key, a situation in which the facsimile apparatus enters a standby state after completing a system operation such as an image copying, signal sending/ receiving or the like, a situation in which a predetermined time has elapsed since the facsimile apparatus entered the standby state, or the like.

When the main control unit 1 determines that the facsimile apparatus is to enter the energy-saving state, the main control unit 1 determines in S02 which functions of the facsimile apparatus are prevented from being deactivated after the facsimile apparatus has entered the energy-saving state. Specifically, at least one of functions of storing image information in a memory, performing a time-specified polling signal reception, a time-specified signal transmission and so forth is prevented from being deactivated, and a time and/or memory associated therewith is appropriately managed. Power is supplied to a unit, in the facsimile apparatus, which performs the managing.

The main control unit 1 sends the energy-saving control signal to the energy-saving control unit 2 in S03. This energy-saving control signal indicates that the units in the facsimile apparatus other than the unit which performs the above-mentioned memory and/or time managing are disconnected from the power source 3. Then the main control unit 1 performs a predetermined subsequent operation.

With reference to FIG. 4, when a user turns a power source switch on, the energy-saving control unit 2 performs initializing in S31. The power source switch is provided on a power supply unit which is the power source 3 shown in FIG. 1. After the power source switch has been turned on, a power is supplied to the facsimile apparatus via an outlet. The initializing is an operation which the facsimile apparatus performs after the power source switch has been turned on and initializes all the units in the facsimile apparatus. Then, the energy-saving control unit 2 reads the energy-saving control signal supplied by the main control unit 1 in S03. In view of the energy-saving signal read in S32, the energy-saving control unit 2 determines in S34 whether or not the facsimile apparatus is to enter the energy-saving state.

When the main control unit 1 has determined S01 shown in FIG. 2 that it is necessary to cause the facsimile apparatus to enter the energy-saving state, the main control unit 1 uses the energy-saving control signal and thus informs this determination to the energy-saving control unit 2. In response to reception of the energy-saving control signal indicating that it is necessary to cause the facsimile apparatus to enter the energy-saving state, the energy-saving control unit 2 performs the same determination in S34.

When it is determined that the facsimile apparatus is to enter the energy-saving state in S34, the energy-saving control unit 2 causes the energy-saving indication unit 72 to indicate that power consumption is reduced in S35. When it is determined that the facsimile apparatus is not to enter the energy-saving state in S34, the energy-saving control unit 2 causes power supply to the energy-saving indication unit 72 to be stopped in S33. Until S34 determines that the facsimile apparatus is to enter the energy-saving state, a loop operation of S32, S34, S33 and then S32 is repeated, for example, every predetermined time period.

When the facsimile apparatus enters the energy-saving state, the energy-saving control unit 2 controls the power-supply switching unit 4 according to the energy-saving control signal read in S32. The power-supply switching unit 4 thus disconnects the power source 3 from the units in the facsimile apparatus other than predetermined units which are to operate in the energy-saving state. For this purpose, the energy-saving control unit 2 determines, in S36, from which units the power source 3 is disconnected. Under the control of the energy-saving control unit 2, the power-supply switching unit 4 disconnects the power source 3 from the motor and equipment driver unit 10 which is not to drive the motors and equipment in the energy-saving state.

Then, the energy-saving control unit 2 determines in S37 whether or not the power source 3 has been disconnected from the main control unit 1. If the power source 3 has been disconnected from the main control unit 1, the energy-saving control unit 2 performs, in S38, detection of the rise trigger signals for canceling the energy-saving state. If the power source 3 has not been disconnected from the main control unit 1, the main control unit 1 performs the detection of the rise trigger signals for canceling the energy-saving state. Thereby, a load borne by the energy-saving control unit 2 can be reduced. However, it is also possible that the energy-saving control unit 2 performs the rise trigger signals in any case.

Figure 3:
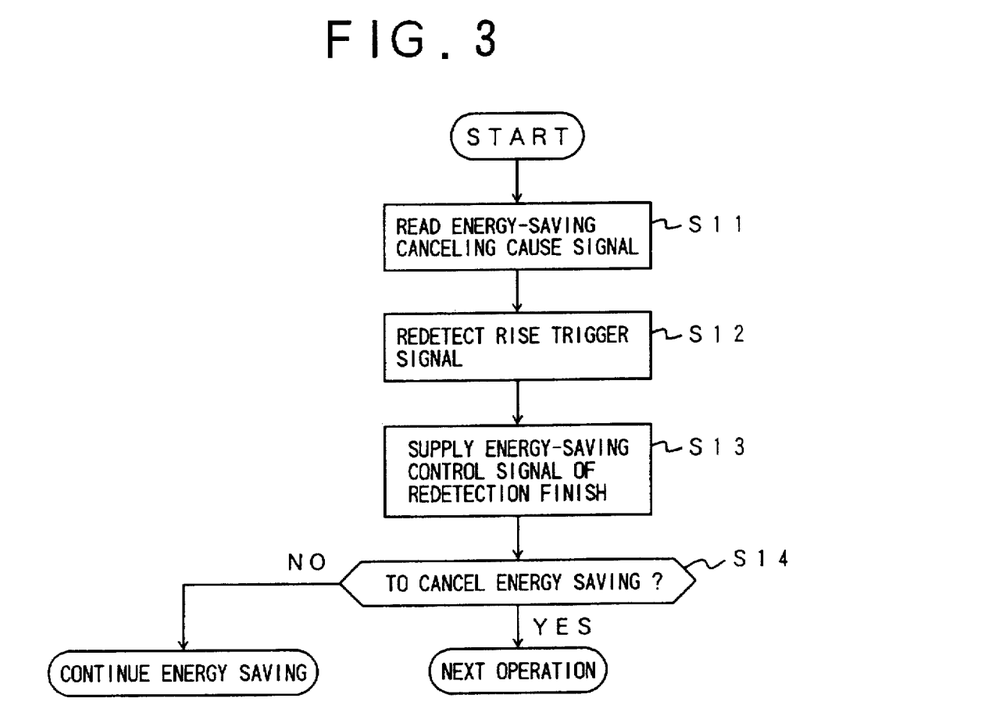
FIG. 3 shows a flowchart of an operation of a main control unit shown in FIG. 1 when the facsimile apparatus exits the energy-saving state.

With reference to FIGS. 3 and 4, an operation of the main control unit 1 and energy-saving control unit 2 when the energy-saving state is canceled and thus the facsimile apparatus exits the energy-saving state will now be described.

With reference to FIG. 3, the power-supply switching unit 4 connects the power source 3 to the main control unit 2 under the control of the energy-saving control unit 2 in S41 shown in FIG. 4. Then, in S11, the main control unit 1 reads the energy-saving canceling cause signal which has been sent from the energy-saving control unit 2 in S40 shown in FIG. 4, which signal indicates, as mentioned above, the relevant rise trigger signal which has been sent from the start/stop key, energy-saving key, original-image sheet setting sensor, on-hook dial key or the like, or which is the ringing signal, facsimile-network calling signal, off-hook signal from the externally provided telephone or the like. Based on the read contents of the energy-saving canceling cause signal, in S12, the main control unit 1 redetects the relevant rise trigger signal so as to examine the rise trigger signal in detail as mentioned above. Thus, it can be determined whether the rise trigger signal causing the energy-saving control unit 2 to determine to cancel the energy-saving state was surely the rise trigger signal which is to cancel the energy-saving state or the energy-saving control unit 2 erroneously detected the rise trigger signal for canceling the energy-saving state. This redetection performed by the main control unit 1 in S12 includes, when the ringing signal is the relevant rise trigger signal, determination of whether or not a detected frequency of the ringing signal fulfills a standard of a country in which the facsimile apparatus is located.

After the redetection is finished, the main control unit 1 outputs the energy-saving control signal indicating finish of the redetection to the energy-saving control unit 2 in S13. Then, in S14, according to the result of the redetection in S12, the main control unit 1 determines in S14 whether or not the current determination by the energy-saving control unit 2 to cancel the energy-saving state has been performed based on a correct detection of the rise trigger signal for this purpose. If it is determined that the current determination to cancel the energy-saving state has been performed based on the correct detection, the main control unit 1 performs a predetermined subsequent operation. If it is determined that the current determination to cancel the energy-saving state has been performed based on an erroneous detection, the operation of entering the energy-saving state shown in FIG. 2 is again performed.

With reference to FIG. 4, when the energy-saving control unit 2 determines to cancel the energy-saving state as a result of detecting the above-mentioned rise trigger signal for canceling the energy-saving state in S39, the energy-saving control unit 2 supplies the above-mentioned energy-saving canceling cause signal to the main control unit 1 in S40. The above-mentioned detected rise trigger signal, which was the cause by which the energy-saving control unit 2 has determined to cancel the energy saving state, is used as the energy-saving canceling cause signal. Then, in S41, the energy-saving control unit 2 controls the power-supply switching unit 4 to connect the power source 3 to units in the facsimile apparatus, which units include the main control unit 1 and other necessary units used for performing the above-mentioned redetection of the rise trigger signal in S12 by the main control unit 1.

During this time, connection of the power source 3 to the energy-saving indication unit 72 is continued. Then, in S42 and S43, the energy-saving control unit 2 waits for the above-mentioned energy-saving control signal indicating the finish of the redetection of the rise trigger signal by the main control unit 1. The main control unit 1 finishes the redetection in S12 and supplies the energy-saving control signal indicating the finish of the redetection in S13 as mentioned above. Then, in S32, the energy-saving control unit 2 reads the energy-saving control signal which is sent from the main control unit.

In this embodiment, the main control unit 1 supplies the energy-saving control signal indicating, as a default setting, that the facsimile apparatus should not enter the energy-saving state. Thereby, when power supply to the main control unit 1 is stopped and then started, the main control unit 1 supplies the energy-saving control signal indicating, as the default setting, that the facsimile apparatus should not enter the energy-saving state. Accordingly, as long as the main control unit 1 does not write information that the facsimile apparatus should enter the energy-saving state in the energy-saving control signal in S03 shown in FIG. 2 after power supply to the main control unit 1 is stopped and then started, the main control unit 1 supplies the energy-saving control signal indicating, as the default setting, that the facsimile apparatus should not enter the energy-saving state.

Therefore, when the main control unit 1 has determined to cancel the energy-saving state in S14 in FIG. 3, the process shown in FIG. 2 is not performed and thus the main control unit 1 does not write information that the facsimile apparatus should enter the energy-saving state in the energy-saving control signal after the power supply to the main control unit 1 is stopped in the energy-saving state and then started. Accordingly, the main control unit 1 supplies the energy-saving control signal indicating, as the default setting, that the facsimile apparatus should not enter the energy-saving state.

However, instead of providing the default setting, it is also possible that the main control unit 1 writes information in the energy-saving control signal indicating whether the facsimile apparatus should enter the energy-saving state each time after the redetection is performed in S12.

According to an indication of the energy-saving control signal, the energy-saving control unit 2 determines whether the determination by the energy-saving control unit 2 to cancel the energy-saving state was based on a correct rise trigger signal or an erroneous one. According to this determination, the energy-saving control unit 2 determines in S34 whether or not the facsimile apparatus is to actually enter the energy-saving state.

Thus, if the determination by the energy-saving control unit 2 to cancel the energy-saving state was based on a correct rise trigger signal, the energy-saving control unit 2 determines in S34 that the facsimile apparatus is to actually exit the energy-saving state. If the determination by the energy-saving control unit 2 to cancel the power saving state was based on an erroneous rise trigger signal, the energy-saving control unit 2 determines in S34 that the facsimile apparatus is not to actually exit the energy-saving state. If the energy-saving control unit 2 determines that the facsimile apparatus is not to exit the energy-saving state, an operation starting from S35 is performed and thus the current energy-saving state is continued.

If the energy-saving control unit 2 determines that the facsimile apparatus is to actually exit the energy-saving state, the power source 3 is connected to each unit in the facsimile apparatus by the power-supply switching unit 4 under control of the energy-saving control unit 2, and is disconnected from the energy-saving indication unit in S33. Thus, the energy-saving state is actually canceled.

In summary, according to the present invention embodied in the first embodiment, two control units, the main control unit 1 controlling the entirety of the facsimile apparatus and the energy-saving control unit 2 controlling entrance into/exit from the energy-saving state are provided. The energy-saving control unit 2 monitors not only a state of the telephone line but also the entirety of the facsimile apparatus by detecting the rise trigger signals when the facsimile apparatus is in the energy-saving state. Thereby, it is possible to control power supply to each unit in the facsimile apparatus according to the monitoring result of the entirety of the facsimile apparatus in addition to that of the telephone line.

Further, the main control unit 1 and energy-saving control unit 2 communicate with one another using the energy-saving control signal and the energy-saving canceling cause signal. Thereby, the two control units 1 and 2 can effectively share control operation in synchronization with each other.

Further, the energy-saving indication unit 72 is provided for indicating that the facsimile apparatus is in the energy-saving state and thus power consumption is reduced, and is controlled by the energy-saving control unit 2. Thereby, a user can easily recognize the energy-saving state.

Further, in the energy-saving state, the power source 3 is disconnected from the motor and equipment driver unit 10. The motor and equipment driver unit 10 is a unit which drives motors and equipment in the facsimile apparatus which do not operate when the facsimile apparatus is in the standby state. By this power supply disconnection, a waste of power resulting from leakage electric currents flowing in the motors and equipment can be eliminated.

Further, if managing of a memory and/or time is needed for a memory image storage operation, a time-specified polling signal reception operation, a time-specified signal transmission operation or the like, the main control unit 1 can inform the energy-saving control unit 2 which units are used for the managing of a memory and/or time and thus are to be connected to the power source 3. Thereby, in the energy-saving state, the managing of a time and/or a memory can be continued. Further, if the memory image storage operation, time-specified polling signal reception operation, time-specified signal transmission operation, a heater prior heating operation or the like is needed in the energy-saving state, the power source 3 can be connected to only appropriate units in the facsimile apparatus. Thereby, a waste of power resulting from supplying power to units which do not actually operate can be eliminated.

Further, the energy-saving control unit 2 uses the energy-saving canceling cause signal to inform the main control unit 1 which rise trigger signal has caused the energy-saving control unit 2 to determine to cancel the energy-saving state. The main control unit 1 can use this information in redetecting the rise trigger signal and thus determining whether the rise trigger signal detected is a correct rise trigger signal for canceling the energy-saving state. There may be an event in which a noise occurs in the communications line, acts as the rise trigger signal and thus causes the energy-saving control unit 2 to determine to cancel the energy-saving state. In such an event, the main control unit 1 redetects the thus-detected rise trigger signal, examines it in detail and thus can determine that the detected signal is merely noise and thus canceling of the energy-saving state is not necessary. By using such a double detection system, it is possible to simplify the energy-saving control unit 1 because the energy-saving control unit 1 should perform merely rough detection. Thereby, it is possible to use the energy-saving control unit 1 which consumes a small power and thus an energy-saving effect is improved.

Figure 5:
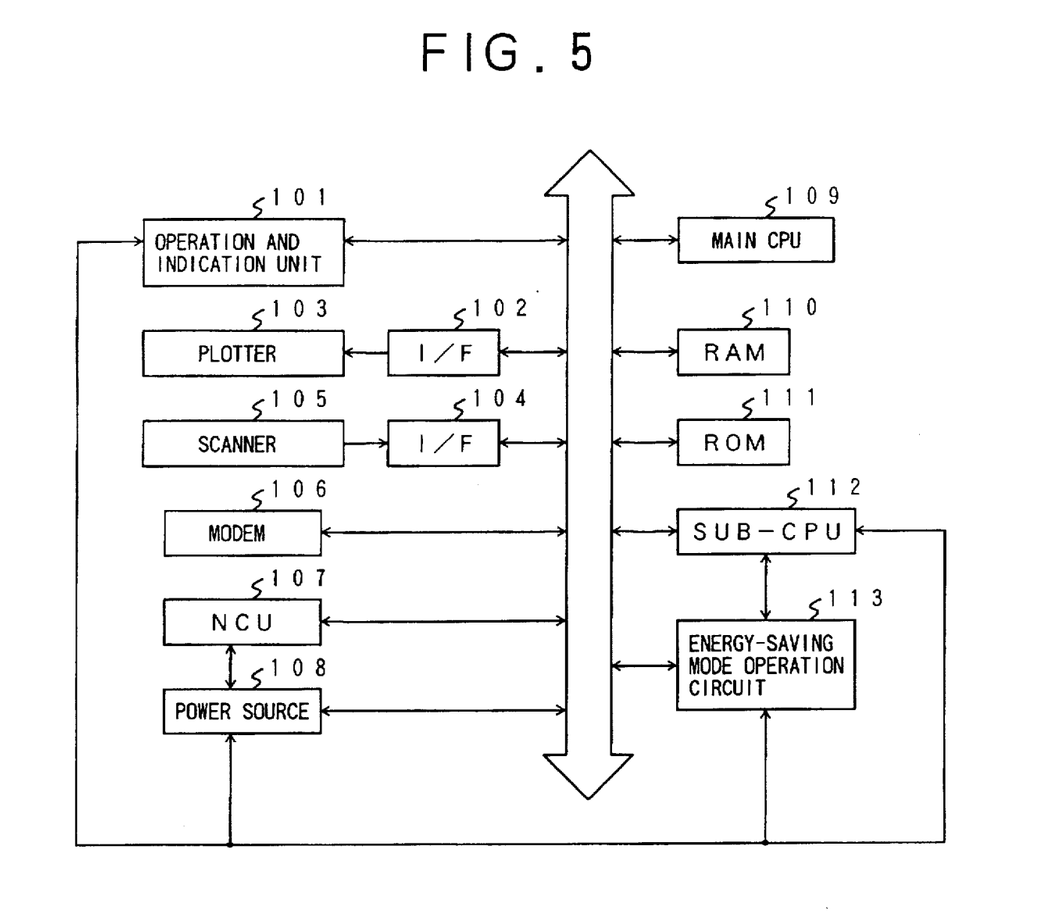
FIG. 5 shows a block diagram of a facsimile apparatus in a second embodiment of the present invention.

With reference to FIG. 5, a facsimile apparatus in a second embodiment of the present invention will now be described. This facsimile apparatus includes an operation and indication unit 101 for performing various operations of the facsimile apparatus, which unit 101 includes a ten-key numeric keypad, an LED, an LCD and so forth. The facsimile apparatus further includes a plotter 103 which prints out received image information, an interface circuit 102 for communication between a main CPU 109 and the plotter 103. The facsimile apparatus further includes a scanner 105 through which image information to be transmitted is input to the facsimile apparatus, and an interface circuit 104 for communication between the main CPU 109 and the scanner 105. The facsimile apparatus further includes a modem 106 which performs modulation and demodulation of image information, and a network control unit (NCU) 107 which acts as an interface between the facsimile apparatus and a public telephone line.

The facsimile apparatus further includes a power source 108 which supplies power to each unit in the facsimile apparatus, the main CPU 109 which systematically controls the facsimile apparatus, a RAM 110 forming a work area for the main CPU 109 and so forth, a ROM 111, a sub-CPU 112 which operates only when the facsimile apparatus is in a strict energy-saving mode, and an energy-saving mode operation circuit 113 which is used for detecting a facsimile-network calling signal or the like.

With reference to FIGS. 6, 7, 8 and 9, an operation of the facsimile apparatus in the second embodiment will now be described.

Figure 6:
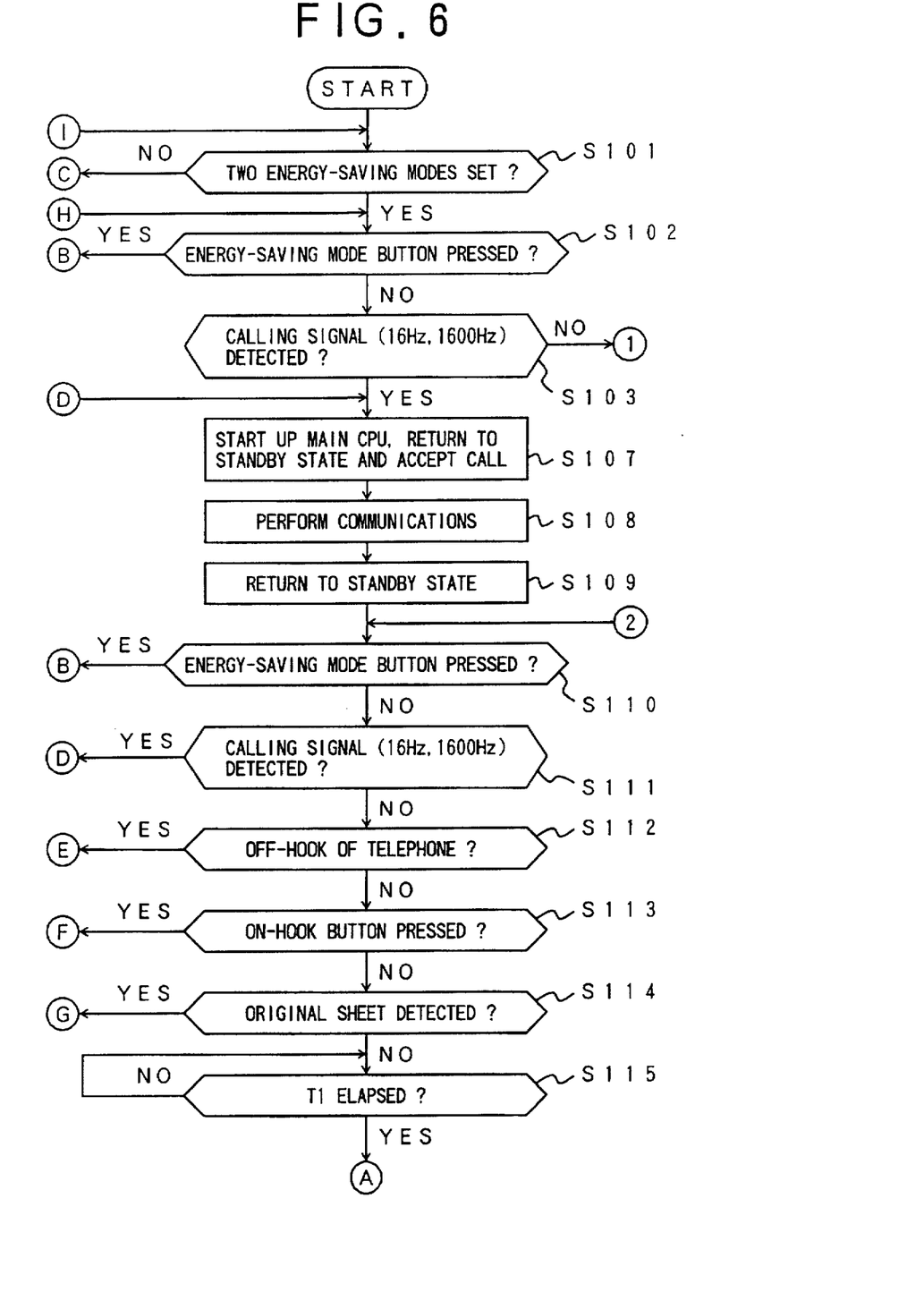
FIGS. 6, 7, 8 and 9 show a flowchart of an energy-saving function of the facsimile apparatus shown in FIG. 5.

A user performs a predetermined operation on the operation and indication unit 101 and thus selects one of software switches (switches indicated in a display of the unit 101). As a result, a predetermined indication is indicated by the operation and indication unit 101. Thereby, a user can obtain information in S101 whether or not each of two energy-saving modes, the strict energy-saving mode and an lenient energy-saving mode has been set in the facsimile apparatus.

If each of the two energy-saving modes has been set, the facsimile apparatus moves from the standby state to the lenient energy-saving mode in S125, and then to the strict energy-saving mode in S134 as time elapses.

As mentioned above, the standby state is a state of the facsimile apparatus in which a user does not actually use the facsimile apparatus. Further, hereinafter, the standby state is also a state in which power is supplied to each unit of the facsimile apparatus.

An energy-saving mode button in the operation and indication unit 101 may be pressed by a user during the time in which the facsimile apparatus moves from the standby state to the strict energy-saving mode. If the energy-saving mode button is pressed once in S103 during this time, the facsimile apparatus immediately enters the strict energy-saving mode in S134.

The strict energy-saving mode will now be described. In this mode, the power source 108 stops supplying power to the main CPU 109 and each block which operates under control of the CPU 109. The power source 108 supplies power only to the sub-CPU 112 and units which operate under control of the sub-CPU 112, these units including the energy-saving mode operation circuit 113, NCU 7, and an original image sheet presence sensor in the operation and indication unit 101. By this power supply, a calling signal, a signal indicating off-hook of an externally provided telephone, a signal indicating that an on-hook button in the operation and indication unit 101 is pressed, a signal indicating that an original image sheet is inserted in the facsimile apparatus, and so forth can be detected. Further, it is also detected that the energy-saving mode button in the operation and indication unit 101 is pressed by a user. By the detection of one of the calling signal, signal indicating off-hook of the externally provided telephone, signal indicating that the on-hook button is pressed, signal indicating that an original image sheet is inserted in the facsimile apparatus, the event that the energy-saving mode button in the operation and indication unit 101 is pressed, and so forth, a signal is supplied to the power source 108 so that power is supplied to the main CPU 109 which can thus start performing a predetermined operation.

The lenient energy-saving mode will now be described. In this mode, only power supply to the LCD and LED is stopped by the power source 108 and power supply to the main CPU 109 and the other remaining units is continued. By this power supply manner, it is possible to immediately start up the facsimile apparatus when one of the calling signal, signal indicating off-hook of the externally provided telephone, signal indicating that the on-hook button is pressed, signal indicating that an original image sheet is inserted in the facsimile apparatus, the event that the energy-saving mode button in the operation and indication unit 101 is pressed, and so forth is detected. In fact, in the strict energy-saving mode, for example, power supply to the plotter 103 is stopped. Therefore, when starting up of the plotter is attempted from a state in which the plotter has been cooled down, a relatively long time is required to substantially start up the plotter 103 and thus cause the plotter to print out received image information. However, in the lenient energy-saving mode, the power supply to the plotter 103 is continued, enabling immediate starting up of the plotter 103. Thus, the received image information can be immediately printed out.

There may be a case where each of the strict and lenient energy-saving modes is set, and none of the calling signal, signal indicating off-hook of the externally provided telephone, signal indicating that the on-hook button is pressed, signal indicating that an original image sheet is inserted in the facsimile apparatus, or the event that the energy-saving mode button in the operation and indication unit 101 is pressed is detected. In this case, after a time T1 then elapses, the facsimile apparatus moves from the standby state to the lenient energy-saving mode. Then, after a time T2 then elapses, the facsimile apparatus moves from the lenient energy-saving mode to the strict energy-saving mode.

Further, there may be another case where only the strict energy-saving mode is set, and none of the calling signal, signal indicating off-hook of the externally provided telephone, signal indicating that the on-hook button is pressed, signal indicating that an original image sheet is inserted in the facsimile apparatus, or the event that the energy-saving mode button in the operation and indication unit 101 is pressed is detected. In this case, after the time T2 then elapses, the facsimile apparatus moves from the standby state to the strict energy-saving mode.

Further, there may be another case where only the lenient energy-saving mode is set, and none of the calling signal, signal indicating off-hook of the externally provided telephone, signal indicating that the on-hook button is pressed, signal indicating that an original image sheet is inserted in the facsimile apparatus, the event that the energy-saving mode button in the operation and indication unit 101 has been pressed is detected. In this case, after the time T1 then elapses, the facsimile apparatus moves from the standby state to the lenient energy-saving mode.

These times T1 and T2 are set as parameters in a software program and are changeable by a user through the operation and indication unit 101. This software program is a program which the main CPU 109 shown in FIG. 5 performs using a table stored in the RAM 110. Thus, the user can determine the times T1 and T2 appropriate for a particular use.

By performing a predetermined operation on the operation and indication unit 101, one of the software switches can be selected. Thereby, only the strict energy-saving mode can be set. Similarly, it is also possible to set only the lenient energy-saving mode. If a user does not wish to use a function with regard to the two energy-saving modes, the user may perform a predetermined operation on the operation and indication unit 101, such that none of the software switches relating to this function can be selected. Thereby, neither of the two energy-saving modes may be set.

With reference to FIG. 6, when it is determined in S101 that each of the two energy-saving modes is set, it is determined in S102 whether or not the energy-saving mode button has been pressed. If this button has been pressed, the facsimile apparatus immediately enters the strict energy-saving mode in S134. If this button has not been pressed, it is determined in S103 whether or not the calling signal has been detected. If this signal is detected in S103, the main CPU 109 is started up by supplying power thereto if power supply to the main CPU was stopped, thus the facsimile apparatus returns to the standby state if the facsimile apparatus is in either the lenient or strict energy-saving mode, and then a call of the detected calling signal is accepted if the main CPU 109 has determined that the detected calling signal fulfills predetermined calling signal detection conditions, in S107. Then, communications are performed in S108. When the communications are finished, the facsimile apparatus enters the standby state in S109.

Figure 7:
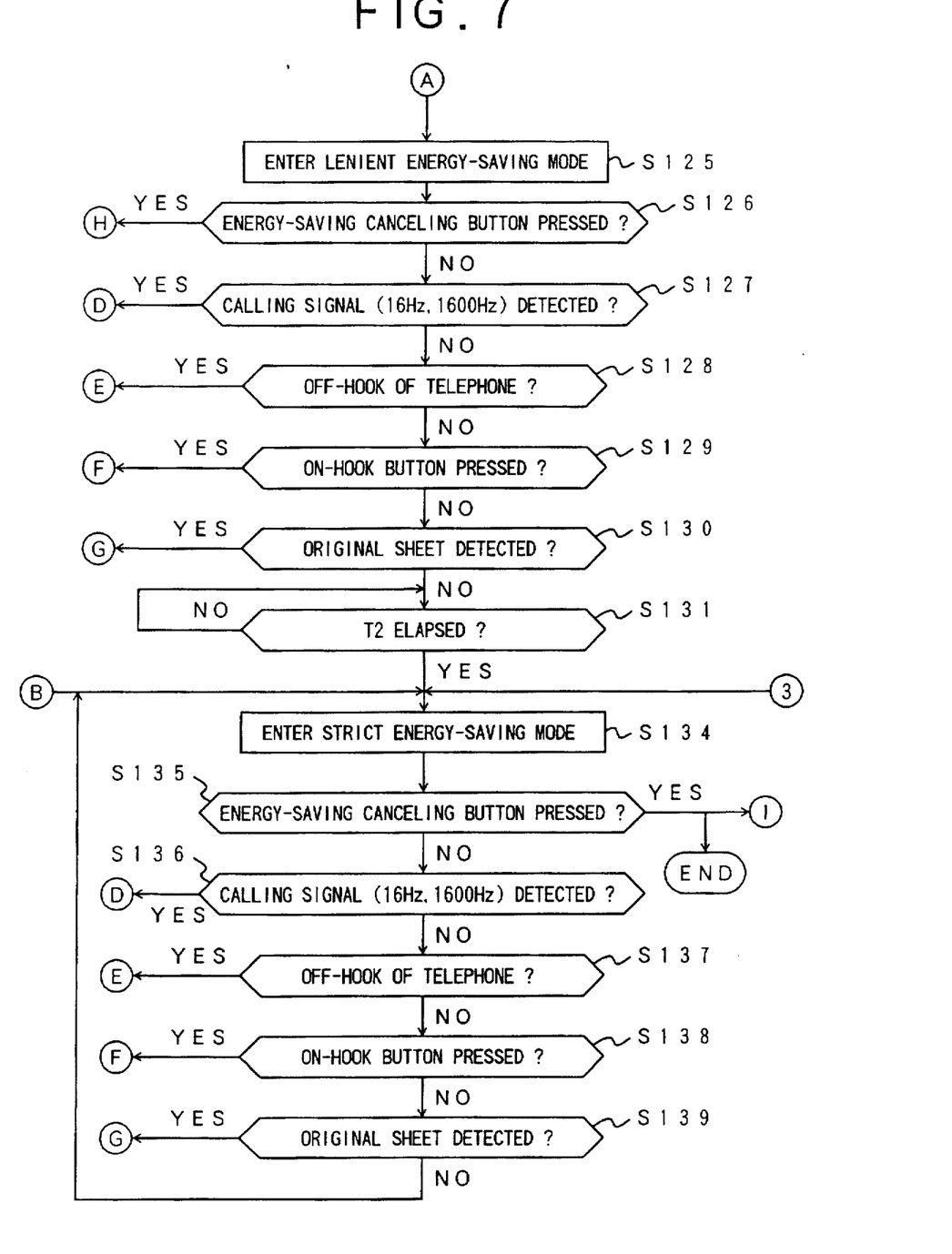

Then it is again determined in S110 whether or not the energy-saving mode button has been pressed. If it has been pressed, the facsimile apparatus immediately enters the strict energy-saving mode in S134. If it has not been pressed, it is again determined in S111 whether or not the calling signal has been detected. If it has been detected, the current operation returns to S107. If has not been detected, it is determined in S112 whether or not off-hook of the externally provided telephone has been performed by a user. If the off-hook has been performed, the current operation moves to S116. If the off-hook has not been performed, it is determined in S113 whether or not the on-hook button has been pressed by a user. If the button has been pressed, the current operation moves to S119. If it has not been pressed, it is determined in S114 whether or not the original image sheet presence sensor has detected that an original image sheet has been inserted in the facsimile apparatus. If it has been detected, the current operation moves to S122. If it has not been detected, it is determined in S115 whether or not the time T1 has elapsed since the facsimile apparatus entered the standby state. It the time T1 has elapsed, the facsimile apparatus enters the lenient energy-saving mode in S125.

If the calling signal has not been detected in S103, it is determined in S104 whether or not the off-hook of the externally provided telephone has been performed. If the off-hook has been performed, the main CPU 109 is started up by supplying power to the main CPU 109 if power supply was stopped to the main CPU 109, and thus the facsimile apparatus returns to the standby state, in S116. Then, a telephone conversation is performed by a user through the externally provided telephone in S117. When the telephone conversation has been finished, the facsimile apparatus returns to the standby state.

If it is determined in S104 that the off-hook has not been performed, it is determined in S105 whether or not the on-hook button has been pressed by a user. If it has been pressed, the main CPU 109 is started up by supplying power to the main CPU 109 if power supply to the main CPU 109 was stopped, and the facsimile apparatus enters an off-hook state, in S119. Then, the facsimile apparatus performs communications in S120. When the communications have finished, the facsimile apparatus returns to the standby state.

If it is determined in S105 that the on-hook button has not been pressed, it is determined in S106 whether or not the original image sheet presence sensor has detected that an original image sheet has been inserted in the facsimile apparatus. If it has been detected, the main CPU 109 is started up by supplying power to the main CPU 109 if power supply to the main CPU 109 was stopped, and the facsimile apparatus enters the standby state, in S122. Then, communications are performed in S123. When the communications have finished, the facsimile apparatus returns to the standby state in S124. If it was determined in S106 that the original image sheet presence sensor has not detected that an original image sheet has been inserted in the facsimile apparatus, the facsimile apparatus enters the strict energy-saving mode in S134.

Figure 8:
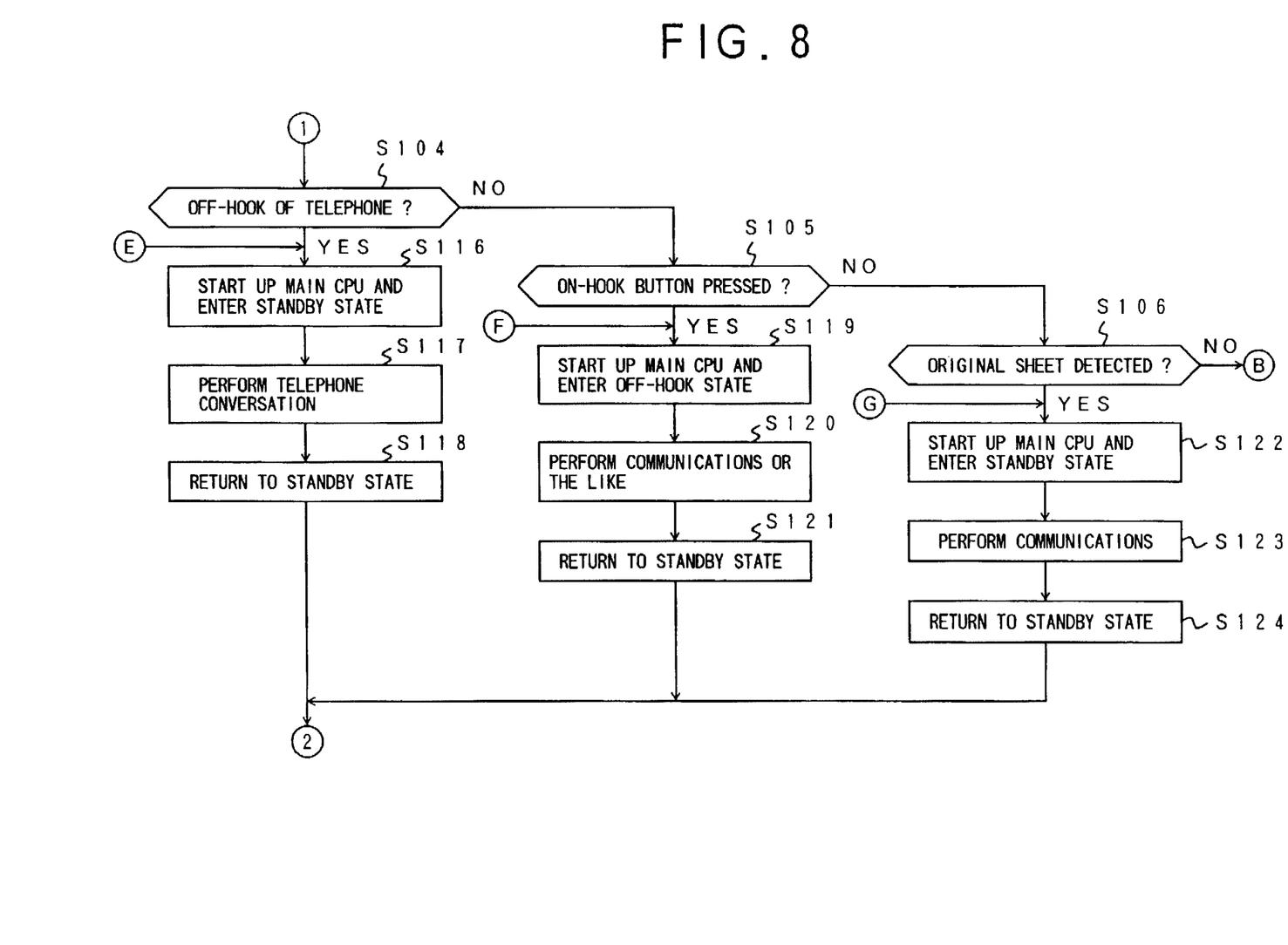

After the facsimile apparatus enters the lenient energy-saving mode in S125, it is determined in S126 whether or not an energy-saving canceling button in the operation and indication unit 101 has been pressed by a user. If it has been pressed, the current operation returns to S102. If the energy saving canceling button has not been pressed, it is determined in S127 whether or not the calling signal has been detected. If the signal has been detected, the current operation returns to S107. If the signal has not been detected, it is determined in S128 whether or not the off-hook of the externally provided telephone has been performed by a user. If the off-hook has been performed, the current operation returns to S116. If the off-hook has not been performed, it is determined in S129 whether or not the on-hook button has been pressed. If the button has been pressed, the current operation returns to S119. If the button has not been pressed, it is determined in S130 whether or not the original image sheet presence sensor has detected that an original image sheet has been inserted in the facsimile apparatus. If it has been detected, the current operation returns to S122. If it has not been detected, it is determined in S131 whether or not the time T2 has elapsed since the facsimile apparatus entered the lenient energy-saving mode in S125. If the time has elapsed, the facsimile apparatus enters the strict energy-saving mode in S134.

Figure 9:
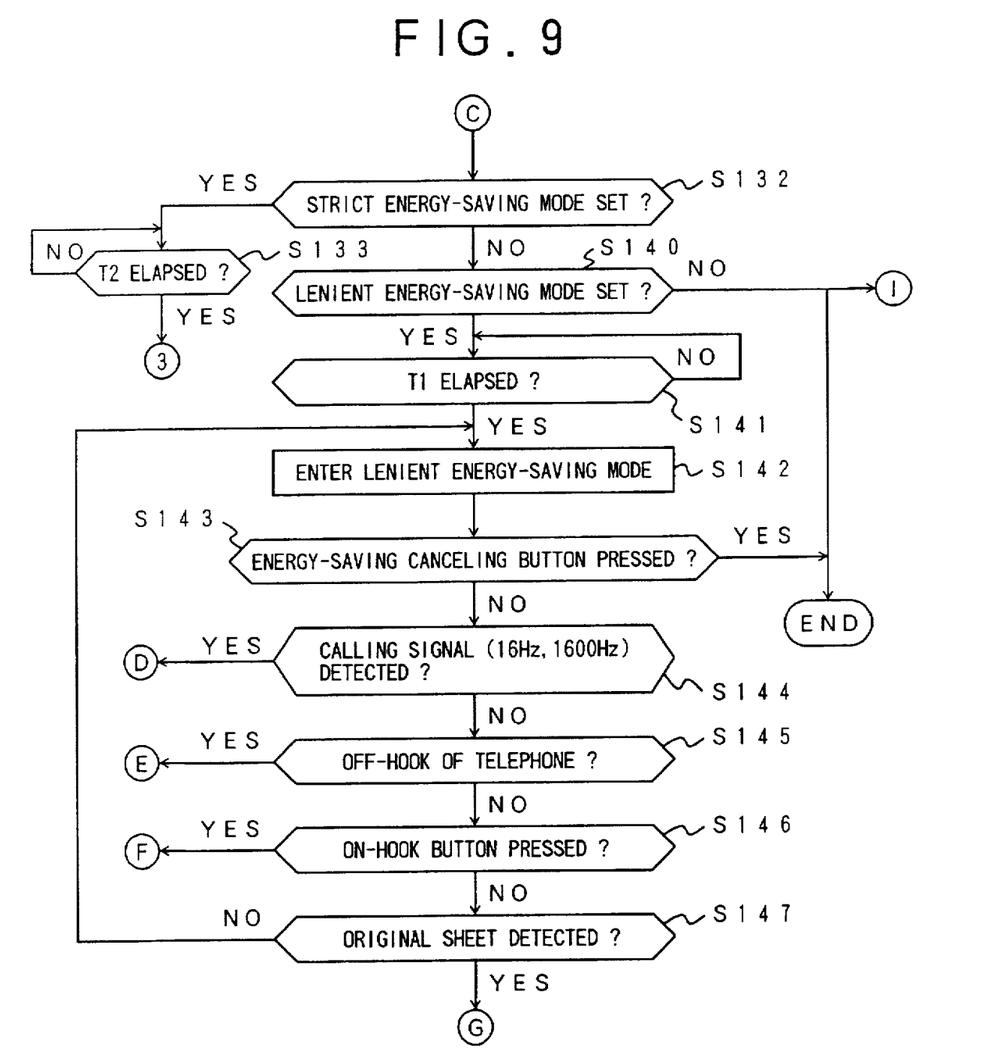

If it has been determined in S101 that any of the two energy-saving modes has not been set, it is determined in S132 whether or not only the strict energy-saving mode has been set. If only the strict energy-saving mode has been set, it is determined in S133 whether or not the time T2 has elapsed since the facsimile apparatus entered the standby state. If the time has elapsed, the facsimile apparatus enters the strict energy-saving mode in S134. Then, it is determined in S135 whether or not the energy-saving canceling button has been pressed. If it has been pressed, the current operation is terminated after the facsimile apparatus returns to the standby state, that is, power is supplied to all the units of the facsimile apparatus. Then, after the current operation has been terminated, an operation is started from S101 shown in FIG. 6 in a predetermined time period.

If the energy-saving canceling button has not been pressed, it is determined in S136 whether or not the calling signal has been detected. If the signal has been detected, the current operation returns to S107. If the signal has not been detected, it is determined in S137 whether or not the off-hook of the externally provided telephone has been performed by a user. If the off-hook has been performed, the current operation returns to S116. If the off-hook has not been performed, it is determined in S138 whether or not the on-hook button has been pressed. If the button has been pressed, the current operation returns to S119. If the button has not been pressed, it is determined in S139 whether or not the original image sheet presence sensor has detected that an original image sheet has been inserted in the facsimile apparatus. If it has been detected, the current operation returns to S122. If it has not been detected, the facsimile apparatus enters the strict energy-saving mode in S134.

It is determined in S140 whether only the lenient energy-saving mode has been set. If it has been determined in S140 that the lenient energy-saving mode has not been set either, the current operation is terminated. If the lenient energy-saving mode has been set, it is determined in S141 whether or not the time T1 has elapsed since the facsimile apparatus entered the standby state. If the time has elapsed, the facsimile apparatus enters the lenient energy-saving mode in S142. Then, it is determined in S143 whether or not the energy-saving canceling button has been pressed. If it has been pressed, the current operation is terminated after the facsimile apparatus returns to the standby state, that is, power is supplied to all the units of the facsimile apparatus. Then, after the current operation has been terminated, an operation is started from S101 shown in FIG. 6 in a predetermined time period.

If the energy-saving canceling button has not been pressed, it is determined in S144 whether or not the calling signal has been detected. If the signal has been detected, the current operation returns to S107. If the signal has not been detected, it is determined in S145 whether or not the off-hook of the externally provided telephone has been performed by a user. If the off-hook has been performed, the current operation returns to S116. If the off-hook has not been performed, it is determined in S146 whether or not the on-hook button has been pressed. If the button has been pressed, the current operation returns to S119. If the button has not been pressed, it is determined in S147 whether or not the original image sheet presence sensor has detected that an original image sheet has been inserted in the facsimile apparatus. If it has been detected, the current operation returns to S122. If it has not been detected, the facsimile apparatus enters the lenient energy-saving mode again in S142.

The energy-saving mode operation circuit 113 cooperates with the sub-CPU 112 and thus executes S135 through S139.

In summary, according to the present invention embodied in the second embodiment, only a single one of the power source 3 is used when the facsimile apparatus enters an energy-saving mode in response to performance of a predetermined operation or no performance of a predetermined operation. Therefore, an energy-saving function can be provided with low costs. Specifically, the former predetermined operation is pressing of the energy-saving button and the facsimile apparatus enters the energy-saving mode in response to performance of this operation. The latter predetermined operation includes not only the pressing of the energy-saving button but also other various operations such as setting of an original image sheet, holding the receiver from the accompanying telephone, and so forth. When no significant operation is performed on the facsimile apparatus and then a predetermined time has elapsed, the facsimile apparatus also enters the energy-saving mode.

Further, it is possible for a user to not use the energy-saving function when the facsimile apparatus is in the standby state. This can be achieved by appropriately operating the software switches of the facsimile apparatus. If so, each of S132 and S140 shown in FIG. 9 has determination of No. By not using the energy-saving function, it is possible to use a facsimile function of the facsimile apparatus immediately when it is required.

Further, by using a function of the lenient energy-saving mode, it is also possible to use the facsimile function of the facsimile apparatus immediately when it is required in a case where the facsimile apparatus is in the lenient energy-saving mode. Further, the times T1 and T2 can be arbitrarily adjusted by a user. Thus, it is possible to have flexibility when using the energy-saving function.

Further, the present invention is not limited to the above-described embodiments, and variations and modifications may be made without departing from the scope of the present invention.

What is claimed is:

1. A facsimile apparatus comprising:

energy-saving means which causes said facsimile apparatus to enter an energy-saving mode in which power consumption is reduced in said facsimile apparatus, and further determines to cause said facsimile apparatus to exit said energy-saving mode when a predetermined cause has been detected; and main control means which controls the entirety of said facsimile apparatus and supplies an energy-saving control signal to said energy-saving means, said energy-saving control signal indicating instructions that said energy-saving means is to perform;

wherein:

said energy-saving means supplies an energy-saving canceling cause signal to said main control means, said energy-saving canceling cause signal indicating the predetermined cause due to which said energy-saving means has determined to cause said facsimile apparatus to exit said energy-saving mode;

said main control means redetects the predetermined cause due to which said energy-saving means has determined to cause said facsimile apparatus to exit said energy-saving mode, and thus determines whether or not the determination of said energy-saving means is based on a correct one of the predetermined cause;

said main control means supplies the energy-saving control signal which instructs said energy-saving means to cause said facsimile apparatus to enter said energy-saving mode when said main control means has determined that the previous determination of said energy-saving means to cause said facsimile apparatus to enter said energy-saving mode is based on the correct cause, and said main control means supplies the energy-saving control signal which instructs said energy-saving means not to cause said facsimile apparatus to exit said energy-saving mode when said main control means has determined that the previous determination of said energy-saving means to cause said facsimile apparatus to enter said energy-saving mode is not based on the correct cause.

2. A facsimile apparatus comprising:

energy-saving means which causes said facsimile apparatus to enter an energy-saving mode in which power consumption is reduced in said facsimile apparatus, and further determines to cause said facsimile apparatus to exit said energy-saving mode when a predetermined cause has been detected; and main control means which controls the entirety of said facsimile apparatus and supplies an energy-saving control signal to said energy-saving means, said energy-saving control signal indicating instructions that said energy-saving means is to perform;

wherein:

said energy-saving means supplies an energy-saving canceling cause signal to said main control means, said energy-saving canceling cause signal indicating the predetermined cause due to which said energy-saving means has determined to cause said facsimile apparatus to exit said energy-saving mode;

the predetermined cause due to which said energy-saving means determines to cause said facsimile apparatus to exit said energy-saving mode comprises an event that an energy-saving on-and-off switch has been pressed, an event that an original image sheet has been set, an event that a ringing signal has been received and an event that an off-hook of an externally provided telephone has been performed.

3. A facsimile apparatus comprising:

energy-saving means which causes said facsimile apparatus to enter an energy-saving mode in which power consumption is reduced in said facsimile apparatus, and further determines to cause said facsimile apparatus to exit said energy-saving mode when a predetermined cause has been detected; and main control means which controls the entirety of said facsimile apparatus and supplies an energy-saving control signal to said energy-saving means, said energy-saving control signal indicating instructions that said energy-saving means is to perform;

a network control unit which detects a calling signal from a switchboard, performs a dial calling, and switches connection with a telephone line between said facsimile apparatus and an externally provided telephone;

a power source which selectively supplies power to units in said facsimile apparatus; and an energy-saving mode operation circuit which controls said power source and causes said power source to supply power to a predetermined one of said units in said facsimile apparatus;

wherein:

said energy-saving means supplies an energy-saving canceling cause signal to said main control means, said energy-saving canceling cause signal indicating the predetermined cause due to which said energy-saving means has determined to cause said facsimile apparatus to exit said energy-saving mode;

said energy-saving means detects, as the predetermined cause, one of a calling signal, a signal indicating an off-hook of said externally provided telephone, a signal indicating that an on-hook button is pressed, a signal indicating that an original image sheet is inserted in said facsimile apparatus, and an event that an energy-saving mode button is pressed, the detection being performed using predetermined signals supplied from units to which power is supplied under control of said energy-saving mode operation circuit; and said energy-saving means determines that said facsimile apparatus should exit said energy-saving mode when having detected one of the calling signal, signal indicating the off-hook of said externally provided telephone, signal indicating that the on-hook button is pressed, signal indicating that the original image sheet is inserted in said facsimile apparatus, and the event that an energy-saving mode button is pressed.

4. A method of energy saving in a facsimile apparatus comprising the steps of:

a) causing said facsimile apparatus to enter a strict energy-saving mode in which power is not supplied to first predetermined units in said facsimile apparatus, said first predetermined units being ones which consume a relatively large amount of power and are such that a relatively long starting up time is required for a process, said process being that said facsimile apparatus exits said strict energy-saving mode, power is supplied to said first predetermined units and thus said facsimile apparatus can actually execute a predetermined function of said facsimile apparatus;

b) causing said facsimile apparatus to enter an lenient energy-saving mode in which power is not supplied to second predetermined units in said facsimile apparatus, said second predetermined units being ones which consume a relatively small amount of power and are such that a relatively short starting-up time is required for a process, said process being that said facsimile apparatus exits said strict energy-saving mode, power is supplied to said second predetermined units and thus said facsimile apparatus can actually execute said predetermined function of said facsimile apparatus;

wherein said step b) is first performed and then said step a) is performed; and wherein a first predetermined time which has elapsed until said step b) is performed and a second predetermined time which has elapsed until said step a) is performed since said step b) was performed are arbitrarily adjusted by modifying a software program which a computer of said facsimile apparatus uses to control said facsimile apparatus.

5. The method according to claim 4, wherein said first and second predetermined times are times applicable under a condition in which none of a calling signal, a signal indicating an off-hook of said externally provided telephone, a signal indicating that an on-hook button is pressed, a signal indicating that an original image sheet is inserted in said facsimile apparatus, an event that an energy-saving mode button is pressed is detected during said first and second predetermined times.

* * * * *